Oct. 2, 1951 R. C. PAULSEN 2,569,827
POLARITY PULSING OF TRIGGERS
Filed Dec. 29, 1948
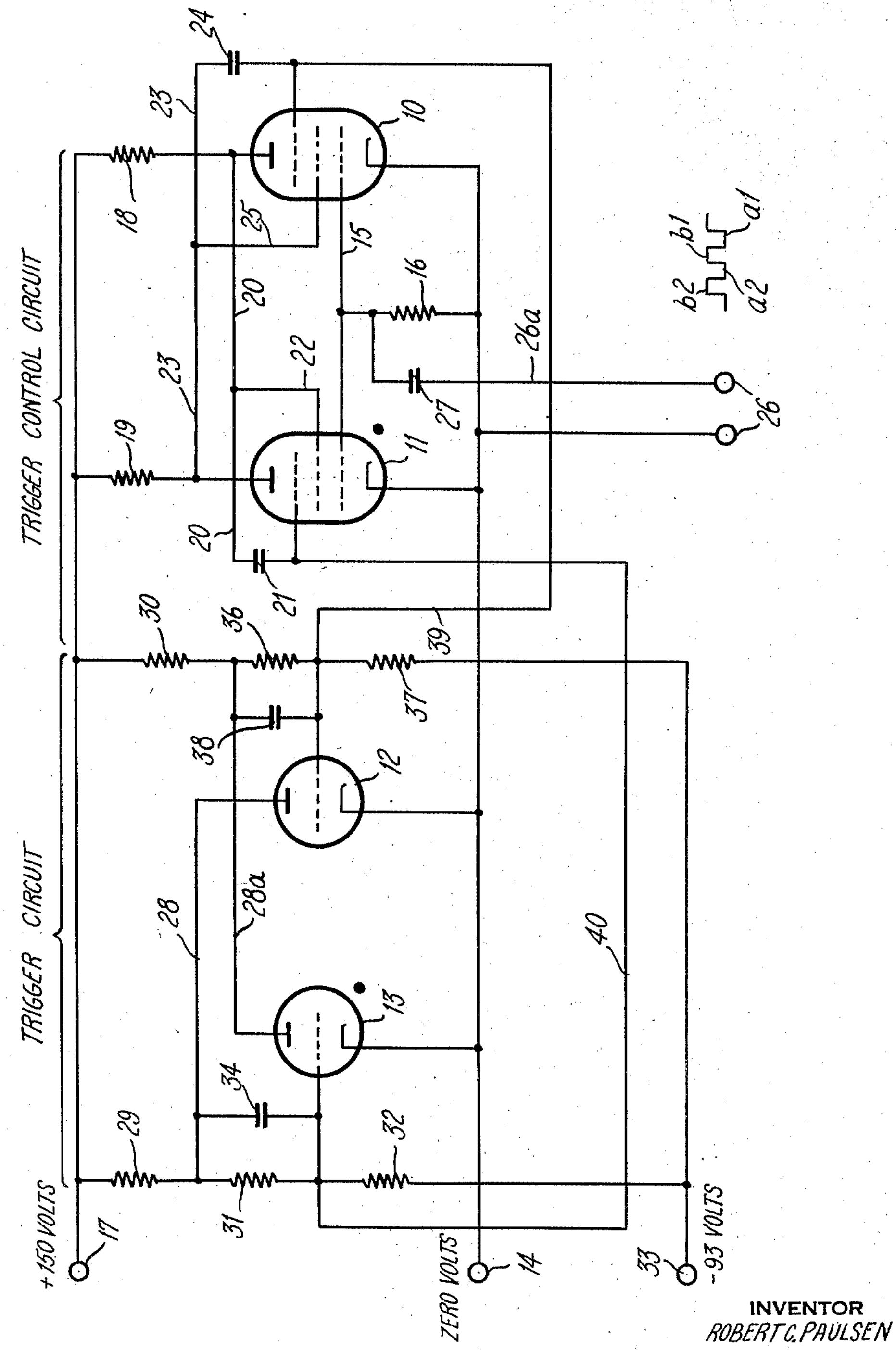
INVENTOR
ROBERT C. PAULSEN
BY
Dwight D. Mooney
AGENT Patented Oct. 2, 1951 2,569,827

UNITED STATES PATENT OFFICE 2,569,827

POLARITY PULSING OF TRIGGERS

Robert C. Paulsen, West Caldwell, N. J., assignor to International Business Machines Corporation, New York, N. Y., a corporation of New York Application December 29, 1948, Serial No. 67,883

7 Claims. (Cl. 250—27)

This invention relates to control circuits and more particularly to a control circuit for applying from a pulse source of dual polarity to a trigger circuit or other switchable circuit, pulses of controlled amplitude and unitary polarity.

Trigger circuits employing two grid controlled tubes each with its plate connected to the control grid of the other tube have two electrical conditions of stability alternately assumed. These conditions are represented by one tube being conductive and the other non-conductive and vice-versa. Frequently, this type trigger circuit is switched from one condition of stability to the other by the simultaneous application of pulses to the control grids of the two tubes.

If such pulses are alternately positive and negative and it is desired to switch the stable condition of the trigger in response to the pulses of one polarity only, the problem of obtaining uniform trigger operation is complicated by the requirement of accurate pulse amplitude adjustment. When the negative pulse applied to both grids is used to switch the trigger by reducing conduction through the initially conducting tube, a positive pulse appears at the control grid of the initially non-conducting tube and overwhelms this negative switching pulse. This action causes conduction through this initially non-conducting tube and also causes a negative pulse to appear at the control grid of the tube that was initially conductive to render it less conductive. Finally, this change and transfer of circuit potentials renders the initially conductive tube non-conductive and the initially non-conductive tube conductive thereby switching the stable condition of the trigger.

The negative switching pulse applied to the control grid of the initially non-conductive tube produces no effect thereon that aids in switching the stable condition of the trigger and even opposes that switching, since its polarity is opposite to that of the pulse, transferred to this control grid from the initially conducting tube.

It is seen that if the amplitude of the negative switching pulses at the control grid of the initially non-conductive tube is of such value that it will not be overwhelmed by the positive pulse transferred from the plate of the initially conducting tube to this control grid, the trigger will not switch and trigger failure results. Providing switching pulses of just sufficient amplitude to insure switching of the trigger by the negative pulses is further complicated by the fact that positive pulses, of slightly greater amplitude than that required of negative pulses to effect switching are of sufficient amplitude to effect switching of the trigger. Hence, if the amplitude of the pulses is too great the trigger will switch in response to both positive and negative pulses applied to the control grids of the tubes of the trigger instead of in response to negative pulses only.

It is therefore an object of the present invention to eliminate the above mentioned shortcomings of the prior art involved in switching a trigger circuit in response to a train of alternately positive and negative pulses.

Another object is to provide a control circuit, operable only in response to pulses of one polarity, for supplying a pulse of the opposite polarity and of limited amplitude alternately to the tubes of a trigger employing a pair of grid controlled tubes.

Still another object is to provide a control circuit operable in response to negative pulses and connected to a trigger having two stable conditions and employing a pair of grid controlled tubes, for supplying and rendering the trigger responsive to positive pulses applied thereto by this control circuit.

A further object is to provide a circuit for determining the stable condition of a trigger employing a pair of alternately conductive grid controlled tubes, which circuit supplies, simultaneously, positive and negative pulses, respectively, to the non-conductive and conductive tubes of the trigger.

A further object is to provide a control circuit for a trigger having two conditions and switchable under control of said trigger from either condition to the other, in response to negative pulses, to thereby supply positive pulses to each of two elements of the trigger, alternately.

A still further object is to provide connections between two circuits, each having two interconnected grid controlled tubes and one switchable from either of two stable conditions upon application of negative pulses to the control grids of the tubes of the other, said one circuit also speeding up the action of the other and said one circuit rendering the other circuit substantially non-responsive to positive pulses.

A still further object is to provide a trigger control circuit and a trigger having higher operating speed when inter-connected than that of either when separately operated.

Other objects of the invention will be pointed out in the following description and claims and illustrated in the accompanying drawing, which discloses, by way of example, the principle of the invention and the best mode, which has been contemplated, of applying that principle.

The single figure of the drawing is a circuit diagram of an embodiment of the invention.

Referring more particularly to the drawing, the novel trigger control circuit comprises two 6SJ7 pentodes 10 and 11 while the trigger, to be controlled, comprises two 6SN7 triodes 12 and 13.

The cathodes of the pentodes 10 and 11 are connected to a zero volt line 14 and the control grids are connected together by a conductor 15 which is connected through a 100,000 ohm resistor 16 to the line 14. The plates of pentodes 10 and 11 are connected to a plus 150 volt line 17 through load resistors 18 and 19, respectively, each of 100,000 ohms. The plate of pentode 10 is connected to the suppressor grid of pentode 11 through a conductor 20 and a capacitor 21 of 0.00005 microfarad and this plate is directly and conductively connected to the screen grid of pentode 11 through the conductor 20 and a conductor 22. Likewise, the plate of pentode 11 is connected to the suppressor grid of pentode 10 through a conductor 23 and a capacitor 24 of 0.00005 microfarad and this plate is directly and conductively connected to the screen grid of pentode 10 through the conductor 23 and a conductor 25.

Since only one pentode is conductive at a time; when pentode 10 is non-conductive, its screen which is connected directly to the plate of the conducting tube 11 is lowered in voltage, the screen grid of pentode 11 being at a high voltage because of its connection to the plate of this non-conducting pentode 10. Because of a similar action when pentode 11 is non-conductive, its screen grid voltage is low and the screen grid voltage of the conducting pentode 10 is high.

One of the input terminals 26 is connected by a conductor 26*a* and a capacitor 27 of 0.00004 microfarad to conductor 15, connecting the two control grids of the pentodes.

The cathodes of triodes 12 and 13 comprising the trigger are connected to the zero volt line 14. The plate of triode 12 is connected through a conductor 28 and a load resistor 29 of 20,000 ohms to the plus 150 volt line 17 while the plate of triode 13 is connected through a conductor 28*a* and a resistor 30 of 20,000 ohms to the plus 150 volt line 17. Conductor 28 also connects the plate of triode 12 to the upper end of a voltage divider consisting of resistors 31 and 32 each of 200,000 ohms. The lower end of this voltage divider is connected to a minus 93 volt bias line 33. A capacitor 34 of 0.000024 microfarad shunts the resistor 31.

Similarly, conductor 28*a* also connects the plate of triode 13 to the upper end of a voltage divider consisting of resistors 36 and 37 each of 200,000 ohms. The lower end of this divider is connected to the minus 93 volt bias line 33. A capacitor 38 of 0.000024 microfarad shunts the resistor 36.

The control grid of triode 12 is connected to the lower junction of the resistor 36 and the capacitor 38 and is also conductively connected via a conductor 39 to the suppressor grid of pentode 10. The control grid of triode 13 is connected to the lower junction of the resistor 31 and the capacitor 34 and is also conductively connected via a conductor 40 to the suppressor grid of pentode 11.

A train of alternately positive and negative pulses is applied to input terminals 26 to determine the condition of the trigger control circuit comprising the pentodes 10 and 11 which in turn control the stable condition of the trigger comprising the triodes 12 and 13. In point of time, the negative pulses are designated as *a1* and *a2* and the positive pulses as *b1* and *b2*. The trigger is of the well-known binary type employing two grid controlled triodes inter-connected so that pulses of predetermined amplitude and polarity applied simultaneously to the control grids of the triodes cause the trigger to assume alternately each of its two stable conditions. As will be understood from the above description and the explanation hereinafter, the stable condition of the trigger is determined by positive pulses received from the trigger control circuit, a positive pulse being applied only to the appropriate tube to switch the stable condition of the trigger.

For the purposes of explanation, the trigger is assumed to be "off" at starting, as shown, this condition being that in which triode 13 is conductive and triode 12 is biased to cutoff and, therefore, non-conductive. The dot to the right of triode 13 indicates that it is conducting and that the trigger is "off."

When a first positive pulse of proper amplitude received from the trigger control circuit is applied to the control grid of triode 12, this grid is rendered sufficiently positive to start conduction through this triode to thereby decrease the voltage at its plate. This decreased voltage is transferred through the parallel connected capacitor 34 and resistor 31 to the control grid of triode 13 to render it less positive and thus decrease the conduction through triode 13. The resulting increased voltage at the plate of the triode 13 is transferred through the parallel connected capacitor 38 and resistor 36 to the control grid of triode 12 to render it still more conductive. This well-known accumulative action continues until triode 13 becomes non-conductive and triode 12 becomes conductive, thereby placing the trigger in the "on" condition.

In a similar manner the second positive pulse, which is applied to the control grid of triode 13, renders it conductive and triode 12 non-conductive, to return the trigger to the "off" condition.

At starting, pentode 11 is assumed to be conducting as shown by the dot to the lower right side thereof and the pentode 10 is therefore assumed to be non-conductive. Negative pulses applied to the terminals 26 cause the trigger control circuit to switch the trigger alternately "on" and "off."

When the first negative pulse, *a1*, is applied across terminals 26, a corresponding negative voltage is applied to the control grids of both pentodes 10 and 11. Since pentode 10 is non-conductive because of the negative voltage on its suppressor grid, this negative voltage applied to its control grid causes no change in its status. The negative pulse *a1* when applied to the control grid of the conducting pentode 11, however, causes a decrease in conduction through this pentode and a corresponding increased voltage at its plate. This increased voltage is transferred over the conductor 23 and the capacitor 24 to the suppressor grid of pentode 10 and via conductors 23 and 25 to its screen grid, to render it conductive. The resulting decreased voltage at its plate is transferred over the conductor 20 and capacitor 21 to the suppressor grid of pentode 11 and via conductors 20 and 22 to the screen grid of this pentode so that it is rendered less conductive and the increased plate voltage, transferred to pentode 10 renders it more conductive, and this in turn causes pentode 11 to become less conductive. Finally, the cumulative action causes pentode 10 to be rendered conductive and pentode 11 non-conductive while the trigger itself is in one stable condition.

In a similar manner the second negative pulse, a2, acts on this control circuit in conjunction with the trigger itself so that their conjoint action reverses the conductive and non-conductive conditions of the pentodes while the trigger, per se, is in its other stable condition. Succeeding negative pulses repeat the above operation.

The trigger circuit and the trigger control circuit are inter-connected by the conductors 39 and 40 to permit each circuit to facilitate the operation of the other. As a result of this mutual inter-action, the capacitors 34 and 38 associated with the trigger circuit are of smaller value than would be possible if the trigger was operated directly by the pulses applied to the terminals 26 and the speed of trigger operation is correspondingly increased.

The novel cooperation of each circuit with the other, subsequent to the application of a negative pulse to the terminals 26 will be made clear by a description of the transfer of voltages from each circuit to the other. Each of these voltages, as will be seen, is of such polarity that it contributes to a switching of the stable condition of the circuit to which it is transferred.

When the negative pulse, a1, is applied, as stated above, to the control grids of pentodes 10 and 11, the trigger control circuit begins to assume one condition, as previously explained. When the plate of pentode 11 becomes more positive, a positive pulse is transferred through the conductor 23, capacitor 24 and conductor 39 to the control grid of the non-conducting triode 12 to render it conductive. When the plate of pentode 10 becomes less positive, a negative pulse is transferred through the conductor 20, capacitor 21 and conductor 40 to the control grid of the conducting triode 13 to render it less conductive. This effect is combined with that of the negative pulse transferred from the plate of triode 12 and hence reduces the time required to place the control grid of the triode 13 at cutoff potential.

In a like manner, the positive pulse transferred from the control circuit over the conductor 39 to the grid of triode 12 is combined with the positive pulse transferred from the plate of triode 13 and reduces the time required to place triode 12 in a stable state of conduction. The fact that a plurality of pulses tending to switch the stable condition of the trigger are applied directly to the control grids of triodes 12 and 13 by the control circuit over the conductors 39 and 40, respectively, each time the stable condition of the trigger is to be switched, lessens the amount of voltage required to be transferred through the parallel connected resistor 31 and capacitor 34 and the parallel connected resistor 36 and capacitor 38, of the trigger itself.

If the trigger as specifically disclosed with the values of components given, solely as an example, was operated directly by the pulse source, capacitors 34 and 38 would each be required to be of 0.00012 microfarad to obtain trigger operation up to a speed of 190 kilocycles. When connected as shown in the drawing and operated through the trigger control circuit, the capacitors 34 and 38 are each reduced to 0.000024 microfarad and the trigger can be operated up to a speed of 270 kilocycles. In other words, the novel combination produces a faster operating trigger in which smaller value and cheaper capacitors are utilized.

It has been shown that the control circuit starts the switching of the trigger circuit from either stable condition and further facilitates it until the control circuit has assumed its other stable condition. The substantial increase in the trigger speed is also aided by the increased speed of the switching of the control circuit because of the transfer of pulses to it from the trigger while the trigger is being switched.

When the negative pulse from the plate of pentode 10 is transferred over the conductor 40 to the control grid of triode 13 and combined with the negative pulse from the plate of triode 12, this grid is made more negative. This more negative voltage is in turn transferred over conductor 40 to the suppressor grid of pentode 11 to render it more negative to cause a corresponding decrease in the conduction of this pentode. This same negative voltage is also transferred through the capacitor 21 and the conductor 20 to the plate of pentode 10 to render it more negative to thus speed up the reversing action of the control circuit.

In a similar manner the combining of positive pulses on the control grid of triode 12 results in a more positive voltage being applied over conductor 39 to the suppressor grid of pentode 10 to render it more conductive and to the plate of pentode 11 to thus speed up the reversing action of the control circuit. Hence, as a result of the transfer of voltages from the trigger to the trigger control circuit, due to the switching action of the trigger, the reversal of the control circuit is speeded up. Finally, the trigger is switched to the "on" condition under control of the control circuit.

When the positive pulse b1 is applied to the control grids of pentodes 10 and 11, it does not produce conduction in pentode 11, since this pentode is held at cutoff by the negative potential applied to its suppressor grid over the conductor 40 as described above. This plus pulse b1 however causes a small increase in the conduction of pentode 10. The resulting negative pulse at its plate is transferred via the conductor 20, capacitor 21 and conductor 40 to the control grid of triode 13. Since its control grid is already at cutoff, the conduction of the triode 13 is unaffected and this positive pulse b1 has no further effect on the trigger or control circuit.

When the next negative pulse, a2, is applied to the control grids of pentodes 10 and 11, inter-action between the trigger and trigger control circuit, similar to the inter-action resulting from the application of the negative pulse a1, switches the trigger "off," as illustrated.

Next, the positive pulse b2 is applied to the control grids of pentodes 10 and 11 and since as stated above the positive pulse b1 had no effect on the conditions of the trigger or trigger control circuit, the positive pulse b2 also causes no change in the status of pentode 10, and the slight increase in the conduction of pentode 11 with the consequent application of a negative pulse to the control grid of triode 12 has no effect thereon since it is held at cutoff by the conducting triode 13.

Conventional output connections may be connected to desired places in the trigger circuit to operate any suitable device in response to the trigger such as, for example, a counter or the like. No output connection is shown or described since its location is a question of choice dependent solely upon the particular result desired.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A trigger control circuit having two grid controlled pentodes each operable to a conductive and to a non-conductive condition, connections from the plate of each pentode to the screen grid of the other and capacitive connections from the plate of each pentode to the suppressor grid of the other, connections between the control grids of the pentodes for receiving pulses of opposite polarities to be applied simultaneously to the control grids, a connection from each of the suppressor grids to a tube of a trigger circuit for rendering the trigger circuit responsive to a switching of the control circuit and also rendering the control circuit non-responsive to pulses of one polarity applied to its control grids.

2. A trigger control circuit having two grid controlled pentodes each operable to a conductive and to a non-conductive condition, connections from the plate of each pentode to the screen grid of the other and capacitive connections from the plate of each pentode to the suppressor grid of the other, connections between the control grids of the pentodes for receiving pulses to be applied simultaneously thereto, a trigger circuit having two grid controlled tubes each alternately conductive and non-conductive and vice-versa to represent two stable conditions and switchable from one of said conditions to the other, a connection from the suppressor grid of one pentode to the control grid of one tube of said trigger circuit and a connection from the suppressor grid of the other pentode to the control grid of the other tube of said trigger circuit, said connections from said suppressor grids serving to transfer a voltage for switching said trigger circuit from either stable condition in response to positive pulses resulting from operation of said trigger control circuit by negative pulses applied to the control grids of said pentodes and said connections from said suppressor rendering said trigger control circuit non-responsive to positive pulses applied to its control grids because of the negative voltage applied to the suppressor grid of the non-conducting pentode.

3. A trigger circuit and a trigger control circuit each including first and second grid controlled tubes, the tubes of said trigger being each alternately conductive and non-conductive and vice-versa to represent two stable conditions, a first coupling connection from the second tube of said control circuit to the control grid of the first tube of said trigger circuit and a second coupling connection from the first tube of the control circuit to the second tube of the trigger circuit, a conductive connection between each tube of said control circuit and its corresponding tube in said trigger circuit, said couplings permitting transfer of voltages between the tubes of the control circuit and the control grids of the corresponding tubes of the trigger circuit and said conductive connections permitting transfer of voltages between the control grids of the tubes of the trigger circuit and the tubes of said control circuit so that switching of said trigger circuit from a stable condition aids in changing the conductive condition of the tubes of the control circuit, and a reversal of the conductive conditions of the tubes of the control circuit aids in changing the conductive condition of the tubes of the trigger circuit, the tubes joined by said connections changing from the conducting to the non-conducting condition and vice-versa substantially simultaneously.

4. In a circuit including a trigger circuit and a trigger control circuit each having two tubes, the tubes of said trigger being alternately conductive and non-conductive and vice-versa to represent two stable conditions, a grid in each tube of said control circuit, said trigger control circuit serving to switch the stable condition of said trigger circuit each time the control circuit is operated, and conductive connections respectively from the tubes of the trigger circuit to a grid of the tubes of the control circuit for applying a positive voltage to one tube of the control circuit and a negative voltage to the other tube of the control circuit to prevent operation of the control circuit in response to operating pulses of positive polarity applied thereto.

5. A circuit including a trigger circuit having two grid controlled tubes alternately conductive and non-conductive and vice-versa to represent two stable conditions determined in accordance with the operated condition of a control circuit arranged to apply a positive pulse to the control grid of the non-conducting tube of the trigger circuit and a negative pulse to the control grid of the conducting tube of the trigger and a parallel connected resistive-capacitive circuit joining the plate of each tube of the trigger circuit to the control grid of the other tube thereof, said resistive-capacitive circuit serving to transfer the voltage change at the plate of each tube of the trigger to the control grid of the other tube to augment the effect of the pulses transferred from the control circuit to the control grids of the trigger circuit, said resistive-capacitive circuits having a smaller time constant and said trigger circuit having a higher operating speed than is possible when said trigger circuit is operated directly by a train of pulses, and means for conveying a train of pulses to the control circuit.

6. An electronic trigger circuit having two grid control tubes and two stable conditions alternately assumed in response to pulses and per se one operating speed, two electron tubes each having one electrode conductively connected to be in parallel with one electrode of a different one of said two grid control tubes, electrical means for applying pulses to said two electron tubes to change the conductive condition thereof and thereby increase the operating speed of said trigger circuit to a speed higher than said one operating speed.

7. A trigger circuit assembly comprising a pair of trigger tubes having per se one operating speed and a pair of grid controlled electronic tubes having per se one operating speed, electrical means for applying operating pulses to the control grids of said electronic tubes, and electrical current transferring means interconnecting a grid of each of said trigger tubes with only one grid of each of said electronic tubes whereby the operation of one pair of tubes increases the speed of operation of the other pair of tubes to an operating speed in excess of said one operating speed.

ROBERT C. PAULSEN.

REFERENCES CITED

The following references are of record in the file of this patent:

UNITED STATES PATENTS

| Number | Name | Date |
|---|---|---|
| 2,270,449 | Kahn | Jan. 20, 1942 |
| 2,289,987 | Norton | July 14, 1942 |
| 2,412,467 | Morton | Dec. 10, 1946 |
| 2,416,513 | Brown | Feb. 25, 1947 |
| 2,418,112 | DeRosa | Apr. 1, 1947 |

FOREIGN PATENTS

| Number | Country | Date |
|---|---|---|
| 563,794 | Great Britain | Sept. 1944 |

OTHER REFERENCES

Review of Scientific Instruments, vol. 10, June 1939, "Switching Action of the Eccles-Jordan Trigger Circuit," by Toomim, pages 191 and 192.